No. 641,285. Patented Jan. 16, 1900.
H. D. GARDY & T. C. BURKE.
POCKET CASH REGISTER.
(Application filed Aug. 15, 1899.)
(No Model.)
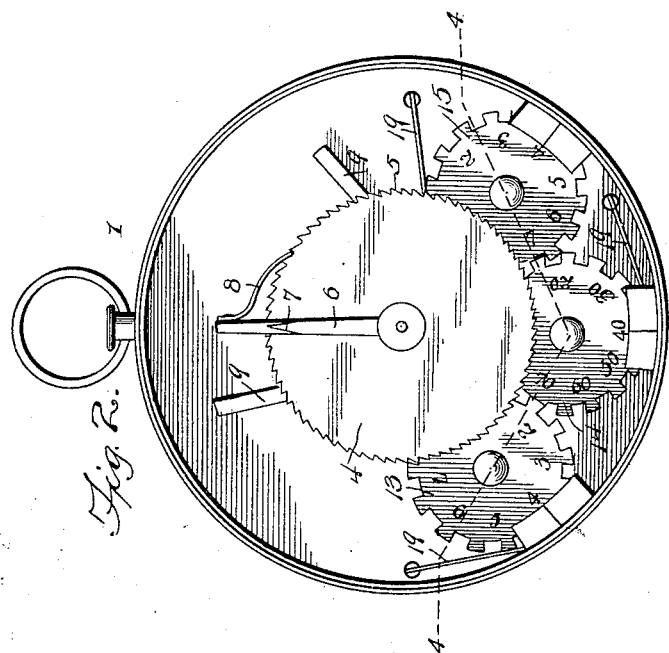
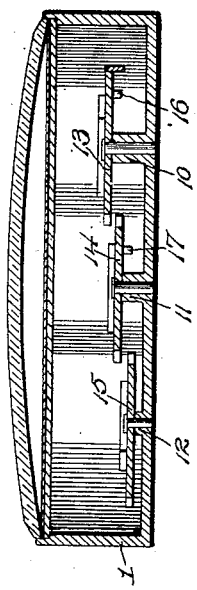
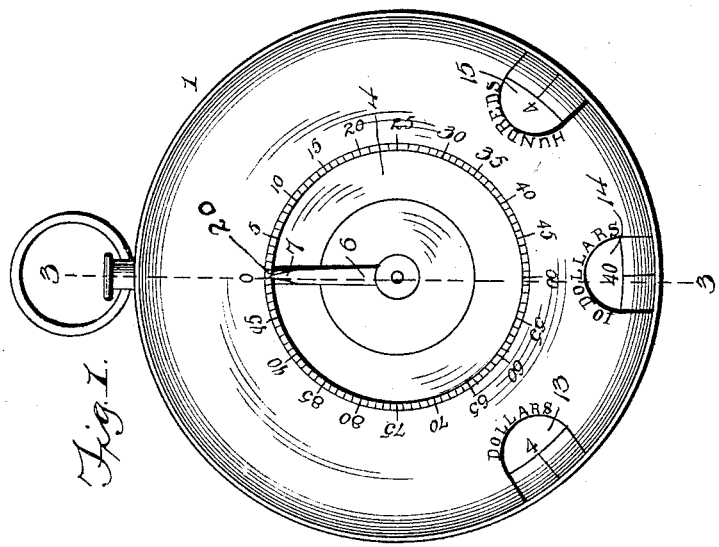
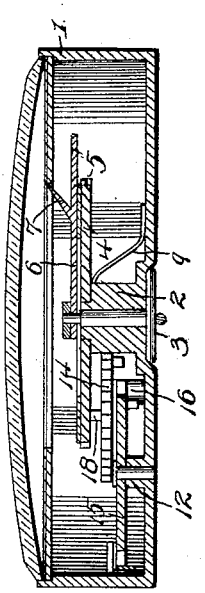
Witnesses
J. Ross Colhoun
M. M. Phelps
Inventors.
H. D. Gardy and
Taylor C. Burke.
by Henry T. Bright Attorney

UNITED STATES PATENT OFFICE.

HENRY D. GARDY AND TAYLOR C. BURKE, OF CHESTER, PENNSYLVANIA.

POCKET CASH-REGISTER.

SPECIFICATION forming part of Letters Patent No. 641,285, dated January 16, 1900.

Application filed August 15, 1899. Serial No. 727,343. (No model.)

*To all whom it may concern:*

Be it known that we, HENRY D. GARDY and TAYLOR C. BURKE, citizens of the United States, residing at Chester, in the county of Delaware and State of Pennsylvania, have invented Improvements in Pocket Cash-Registers, of which the following is a specification.

This invention relates to cash-registers, and particularly to that class known as "calculating" or "adding" registers.

The objects of the invention are to produce a cash-registering device which is so compact that it may be carried in the pocket of the user; second, to provide novel means whereby the amounts are automatically registered and the totals indicated; third, to produce such a device possessing advantages in points of simplicity, durability, and efficiency, and, finally, to construct the device in such manner as to render it comparatively inexpensive.

With the above and other objects in view the invention consists in the novel details of construction and in the arrangement and combination of parts to be hereinafter more fully set forth and specifically claimed.

In describing the invention in detail reference will be had to the accompanying drawings, forming part of this specification, wherein like characters denote corresponding parts in the several views, in which—

Figure 1 is a plan view of the face of the registering device embodying the invention. Fig. 2 is a plan view with the face-plate removed. Fig. 3 is a central section on the line 3 3. Fig. 4 is a section, taken through the axis of the several indicating-wheels, on the line 4 4.

In the drawings, 1 indicates a suitable casing, which may be of any suitable material, to contain the operating mechanism. Centrally of the casing is a spindle 2, having a thumb-knob 3 attached and projecting from the rear of the casing. The form of this knob is immaterial, and it will not be described in detail. A disk 4 is loosely mounted on the spindle and arranged with a toothed periphery 5, the said teeth being inclined to form ratchets. On the spindle with the disk is an arm 6, with a spur 7 cut therefrom, which acts as an indicator. Near the end of the arm is a spring-dog 8, designed to engage the ratchet-teeth of the disk, whereby said disk is rotated. The springs 9, which are attached to the bottom of the casing, exert sufficient pressure on the disk to prevent accidental movement thereof. Studs 10, 11, and 12 are secured to the bottom of the casing, and on these studs are mounted the wheels 13, 14, and 15, respectively, the first-named wheel having its lower surface on approximately the same horizontal plane as the top of the second-named wheel, and the second-named wheel having its lower surface on approximately the same horizontal plane as the upper surface of the last-named wheel. The first-named wheel of the series is provided with a lug 16, which engages and throws the second-named wheel the distance of one tooth when it has made a complete turn, and the second-named wheel is likewise provided with a lug 17, which engages and throws the last-named wheel the distance of one tooth when the said second wheel has made a complete turn. The first of this series of wheels has its initial motion imparted to it by a lug 18 on the lower surface of the disk 4 on the spindle. Each one of the series of wheels is provided with a spring 19, which exerts sufficient pressure to prevent retrograde movement or undue play.

The wheel 13 is provided with numerals for each of the teeth from "0" to "9," and the second wheel is provided with numerals at each tooth ranging from "0" to "90," and the wheel 15 is provided with numerals ranging from "0" to "9." The dial or face of the indicator is numbered from "0" to "95."

In the arrangement shown the graduations of the dial indicate cents, and the arm 6, taking motion from the spindle 2, which is moved by the thumb-piece *a*, is to be moved one space for each cent. For each dollar a complete rotation of the spindle will be necessary, and when said arm has been turned from "0" on the face around to the "0" it will indicate one hundred cents or one dollar. When the arm has reached this point, it is arrested by a stop 20, turned up from the face-plate, and the arm can be turned no farther in the direction it had been traveling. In order to make a further register, the spindle must be turned back, and the arm thereon will also be carried back, and its spring-dog will ride over the teeth of the disk without moving said disk. Now when the arm abuts the lug 20 on the opposite side it will be set, and repetition of the manipulation first indicated will be in order.

The studs on the disk and on the several wheels are so positioned as to engage the teeth and partially turn the wheels in their order just as the arm 6 has abutted the stop 20.

From the foregoing it will be understood that with a complete rotation of the disk 4 the wheel 13 is turned the distance of one tooth to expose the numeral "1." Thus one dollar is registered. With ten such movements the "0" on wheel 13 and "10" of wheel 14 will be exposed, thus indicating ten dollars, and when the wheel 14 has been turned the distance of ten teeth or a full rotation the wheel 15 will expose "1," this being the "hundreds-wheel," and so mark the total amount registered by the arm, and the several wheels can be instantly determined.

Having fully described our invention, what we claim as new, and desire to secure by Letters Patent, is—

In a cash-register, a casing, a spindle centrally thereof provided with an operating-knob which projects from the rear of the casing, a disk loosely mounted on the spindle having a toothed periphery inclined in one direction to form ratchet-teeth, an arm mounted on the spindle and taking motion therefrom, a spring-dog secured to the edge of the arm with its end curved to engage the teeth of the disk, a face-plate for the casing having a stop 20 formed therewith adapted to arrest the arm, a dial on the face-plate, a spur struck from the arm and bent up over the edge of the dial, a stud projecting from the lower edge of the disk, a series of toothed wheels, each on a different horizontal plane, lugs on the first and second wheels engaging teeth on the second and third wheels respectively, the lug of the disk engaging the teeth of the first-named wheel, springs attached to the bottom of the casing and bearing against the under faces of the disk and several wheels, the upper faces of the said wheels being provided with suitable characters, as and for the purpose specified.

H. D. GARDY.
T. C. BURKE.

Witnesses:
J. M. ALLEN,
H. E. GREENWOOD.